(12) United States Patent
Skinner et al.

(10) Patent No.: US 8,339,219 B1
(45) Date of Patent: Dec. 25, 2012

(54) PASSIVE HYBRID SENSING TAG WITH FLEXIBLE SUBSTRATE SAW DEVICE

(75) Inventors: Jack L. Skinner, Brentwood, CA (US); Eric Y Chu, Palo Alto, CA (US); Harvey Ho, Pleasanton, CA (US)

(73) Assignee: Sandia Corporation, Albuquerque, NM (US)

( * ) Notice: Subject to any disclaimer, the term of this patent is extended or adjusted under 35 U.S.C. 154(b) by 346 days.

(21) Appl. No.: 12/777,355

(22) Filed: May 11, 2010

Related U.S. Application Data (60) Provisional application No. 61/216,646, filed on May 19, 2009.

(51) Int. Cl.
- *H03H 9/64* (2006.01)
- *G08B 1/08* (2006.01)
- *G08B 17/12* (2006.01)
- *G08B 21/00* (2006.01)
- *G08C 19/12* (2006.01)

(52) U.S. Cl. ............ 333/193; 333/150; 310/313 R; 340/10.1; 340/12.51; 340/13.26; 340/539.26; 340/600; 340/602; 340/665

(58) Field of Classification Search .......... 333/193, 333/150; 310/313 R; 340/10.1, 12.51, 13.26, 340/539.1, 539.26, 540, 584, 600–602, 665
See application file for complete search history.

(56) References Cited

U.S. PATENT DOCUMENTS

| | | | | |
|---|---|---|---|---|
| 4,242,671 | A * | 12/1980 | Plows | 367/2 |
| 5,438,305 | A * | 8/1995 | Hikita et al. | 333/32 |
| 7,369,014 | B1 * | 5/2008 | Fehsenfeld et al. | 333/193 |
| 7,730,772 | B2 * | 6/2010 | Cook et al. | 73/146.5 |
| 2004/0130442 | A1 | 7/2004 | Breed | |
| 2008/0030324 | A1 * | 2/2008 | Bekritsky et al. | 340/539.22 |
| 2008/0117058 | A1 * | 5/2008 | Oberle | 340/572.8 |
| 2008/0143480 | A1 * | 6/2008 | Egbert et al. | 340/10.1 |
| 2009/0167503 | A1 | 7/2009 | Cook | |
| 2009/0173935 | A1 | 7/2009 | Cho | |
| 2009/0256723 | A1 | 10/2009 | Peddie | |

FOREIGN PATENT DOCUMENTS

WO  WO2009123385 A1  10/2009

OTHER PUBLICATIONS

B. Warneke; B. Atwood; K. S. J. Pister; "Smart dust mote forerunners," in Micro Electro Mechanical Systems, 2001. MEMS 2001. The 14th IEEE International Conference on, 2001, pp. 357-360.

(Continued)

*Primary Examiner* — Barbara Summons (74) *Attorney, Agent, or Firm* — Timothy P. Evans (57) ABSTRACT

The integration of surface acoustic wave (SAW) filters, microfabricated transmission lines, and sensors onto polymer substrates in order to enable a passive wireless sensor platform is described herein. Incident microwave pulses on an integrated antenna are converted to an acoustic wave via a SAW filter and transmitted to an impedance based sensor, which for this work is a photodiode. Changes in the sensor state induce a corresponding change in the impedance of the sensor resulting in a reflectance profile. Data collected at a calibrated receiver is used to infer the state of the sensor. Based on this principal, light levels were passively and wirelessly demonstrated to be sensed at distances of up to about 12 feet.

11 Claims, 10 Drawing Sheets

OTHER PUBLICATIONS

Aman Kansal; Jason Hsu; Sadaf Zahedi; Mani B. Srivastava; "Power Management in Energy Harvesting Sensor Networks," Transactions on Embedded Computing Systems, 2007, pp. 1-38, vol. 6, No. 4, Article 32, Sep. 2007.

A. Pohl; "A Review of Wireless SAW Sensors," IEEE Transactions on Ultrasonics Ferroelectrics and Frequency Control, 2000, pp. 317-332, vol. 47, No. 2, Mar. 2000.

L. Reindl; G. Scholl; T. Ostertag; H. Scherr; U. Wolff; F. Schmidt; "Theory and Application of Passive SAW Radio Transponders as Sensors," IEEE Transactions on Ultrasonics Ferroelectrics and Frequency Control, 1998, pp. 1281-1292, vol. 45, No. 5, Sep. 1998.

U. Wolff; F. Schmidt; G. Scholl; V. Magori; "Radio Accessible SAW Sensors for Non-Contact Measurement of Torque and Temperature," in Ultrasonics Symposium, 345 E 47th St, New York, NY 10017, 1996, pp. 359-362.

A. Pohl; F. Seifert; "Wirelessly Interrogable SAW-Sensors for Vehicular Applications," in IEEE Proceedings of the Instrumentation and Measurement Technology Conference, 1996, 2, pp. 1465-1468, Brussels, Belgium, Jun. 4-6, 1996.

S. A. Stauth; B. A. Parviz; "Integration of Silicon Circuit Components onto Plastic Substrates Using Fluidic Self-Assembly," in Proceedings of the 2005 International Conference on MEMS, NANO and Smart Systems, 2005, pp. 147-152.

H. Ho; E. Chu; M. A. Forman; J. L. Skinner; "Locally Passive Hybrid Sensing Tags Based on Flexible Substrates and Surface Acoustic Wave Devices", Solid-State Sensors, Actuators and Microsystems Conference, Transducers 2009, Denver, CO, pp. 1853-1856, Jun. 21-25, 2009.

M. Jung; J. Kim; J. Noh; N. Lim; C. Lim; G. Lee; J. Kim; H. Kang; K. Jung; A. D. Leonard; J. M. Tour; G. Cho; "All-Printed and Roll-to-Roll-Printable 13.56-MHz-Operated 1-bit RF Tag on Plastic Foils", IEEE Transactions on Electron Devices, 2010, pp. 571-580, vol. 57, No. 3, Mar. 2010.

* cited by examiner

PASSIVE HYBRID SENSING TAG WITH FLEXIBLE SUBSTRATE SAW DEVICE

CROSS-REFERENCE TO RELATED APPLICATIONS

This application claims priority to prior co-pending U.S. Provisional Patent Application Ser. No. 61/216,646 originally filed May 19, 2009 and entitled "Passive Hybrid Sensing Tag with Flexible Substrate SAW Device" from which benefit is claimed.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

BACKGROUND

1. Field of the Invention

The present invention relates generally to wireless sensor technology. More particularly, the invention relates to a wireless Surface Acoustic Wave (SAW) device integrated on a flexible membrane substrate further comprising an integrated antenna and an impedance-based sensor such as a photodiode.

2. Description of the State-of-the-Art

Energy collection and storage can often limit the effectiveness of distributed wireless sensor networks. Utilization of sensor nodes equipped with either battery or power scavenging technology for long term applications can be challenging. Batteries have a finite amount of stored energy which limits the useful lifetime of the sensor. The energy landscape available to a power scavenging device can be unreliable and uncontrollable. It is possible to extend the lifetime of a sensor through low power electronics and power management (B. Warneke, B. Atwood, and K. S. J. Pister, "Smart dust mote forerunners," in *The 14th IEEE International Conference on Micro Electro Mechanical Systems*, 2001, pp. 357-360; K. Aman, H. Jason, Z. Sadaf, and B. S. Mani, "Power management in energy harvesting sensor networks," *Transactions on Embedded Computing Systems*, 2007, v. 6: p. 32) but the energy available at the device is still limited.

Surface Acoustic Wave (SAW) devices can offer wireless sensor nodes a locally passive method of operation in environments where battery or scavenged power is not viable. Similar to a Passive Radio-Frequency Identification (RFID) system, a SAW-based sensor system is powered by the energy of a microwave interrogation pulse. A SAW sensor connected to an antenna can receive microwave energy at one port, convert it to acoustic energy internally and then into a narrow band interrogation signal on the output port. The output signal "pings" a sensor which has varying impedance based on its state. Due to the impedance mismatch at the load and SAW device, a signal is reflected back from the load, backwards through the SAW filter, and re-radiated out the antenna. A calibrated receiver can pick up the signal and determine the state of the sensor based on the reflected signature. In this way, a sensor node deployed in the field can remain dormant and functional for long periods of time.

A number of groups have developed sensor tags that can monitor nearly any physical parameter (e.g. A. Pohl, "A review of wireless SAW sensors," *IEEE Transactions on Ultrasonics Ferroelectrics and Frequency Control*, 2000, v. 47: pp. 317-332; L. Reindl, G. Scholl, T. Ostertag, H. Scherr, U. Wolff, and F. Schmidt, "Theory and application of passive SAW radio transponders as sensors," *IEEE Transactions on Ultrasonics Ferroelectrics and Frequency Control*, 1998, v. 45: pp. 1281-1292; U. Wolff, F. Schmidt, G. Scholl, and V. Magori, "Radio accessible SAW sensors for non-contact measurement of torque and temperature," in *Ultrasonics Symposium*, 345 E 47TH ST, NEW YORK, N.Y. 10017, 1996, pp. 359-362). For instance, A. Pohl et al., discuss a method for monitoring tire health for automotive applications in situ (A. Pohl and F. Seifert, "Wirelessly Interrogable SAW-Sensors for Vehicular Applications," in *IEEE Proceedings of the Instrumentation and Measurement Technology Conference*, 1996, v. 2: pp. 1465-1468). However, the majority of the sensors that have been developed to date are based on rigid substrates and require connectors to external antennas.

To overcome these limitations, we present herein a low-profile SAW sensor tag with an integrated antenna on a flexible substrate. Specifically, we use a photodiode to wirelessly and passively sense light levels. These sensors, once fabricated, can be applied like postage stamps to flat or curved surfaces or structures. Such tags loaded with strain sensors would allow a user to monitor the structural health of buildings and bridges on a long-term basis. These devices would also allow for the near instantaneous determination of the integrity of these structures following a catastrophic event such as a fire, an earthquake, a tornado or a hurricane.

SUMMARY

In one illustrated embodiment of the present disclosure, a passive wireless sensor is provided that includes a surface acoustic wave (SAW) filter electrically connected with an impedance changing element and an antenna matched to a microwave frequency and mounted on a compliant substrate. The antenna receives energy from a microwave interrogation pulse at one port, converts that energy to acoustic energy internally and then into a narrow band reflectance signal on the output port. The substrate of the device onto which the separate components are placed and interconnected is mechanically compliant being able to easily flex and thereby allow the device to be placed on nearly any surface.

In at least one illustrated embodiment of the present disclosure, the device is an interconnected chip-set and integrated antenna mounted on a flexible plastic substrate.

In another illustrated embodiment of the present disclosure, the device includes at least one impedance-based sensor selected from but not limited to the list consisting of photodetectors, temperature sensors, pressure sensors, strain sensors, acoustic sensors, electromagnetic radiation sensors, electrochemical sensors and humidity/dew point sensors.

In still other illustrated embodiments of the present disclosure, the device includes a substrate material selected from but not limited to the list consisting of polyesters such as polyethylene terephthalate (PET); polyimide materials such as poly(4,4'-oxydiphenylene-pyromellitimide) (e.g., KAPTON®); cloth comprised of aromatic polyamide fibers such as the p-phenylene terephtalamides (e.g., KEVLAR®, NOMEX®, TWARON®, or X-FIPER®); or cloth comprised of resin impregnated or non-impregnated cellulose, glass or carbon fibers; and equivalents thereof.

In still another illustrated embodiment of the present disclosure, the device includes an antenna extension.

In a further illustrated embodiment of the present disclosure, the device includes an antenna integrated entirely on the flexible substrate.

BRIEF DESCRIPTION OF THE DRAWINGS

The accompanying drawings illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF EMBODIMENTS OF THE INVENTION

In the following detailed description, reference is made to the accompanying drawings which form a part hereof and in which is shown, by way of illustration, specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense.

Figure 1A:
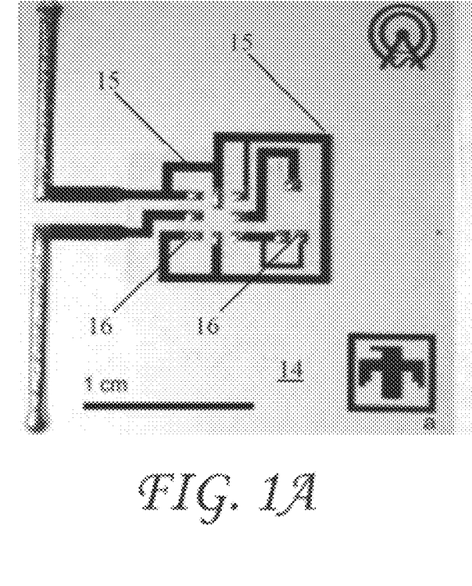
FIGS. 1A and 1B respectively show a first embodiment of a low-profile flexible sensor tag made on a polyethylene terephthalate (PET) substrate before and after assembly.
Figure 1B:
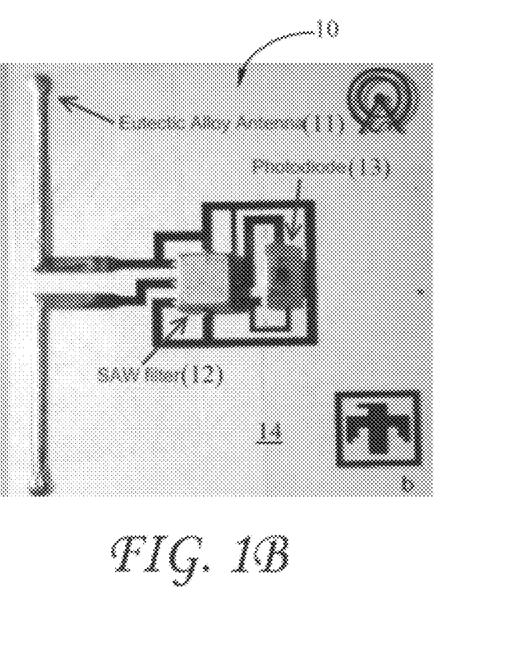

A 315 MHz Embodiment:

The SAW sensor tag 10, shown in FIGS. 1A and 1B is comprised of a microfabricated antenna 11 and commercial-off-the-shelf parts including a nominal 315 MHz center frequency SAW filter 12 (P/N B376x, EPCOS Inc., Palo Alto, Calif.) and an impedance changing element comprised of a visible wavelength photodiode 13 such as, for example, semiconductor P/N TEMD6010FX01 (available from Vishay Intertechnology, Inc., Malvern, Pa., or Vanguard International Semiconductor Corporation, Hsinchu, Taiwan) atop a flexible substrate 14 patterned with metal interconnects 15. Other impedance changing elements are, of course, also possible including but not limited to pressure sensors, strain sensors, acoustic sensors, electromagnetic radiation sensors, electrochemical sensors and humidity and dew point sensors.

Finally, antenna 11 and metal interconnects 15 of this embodiment, therefore, were patterned on a sheet of polyethylene terephthalate (PET) but many other substrate materials are also possible. These include but not limited to polyesters other than PET; polyimide materials such as poly(4,4'-oxy-diphenylene-pyromellitimide) (e.g., KAPTON®); cloth comprised of aromatic polyamide fibers such as the p-phenylene terephtalamides (e.g., KEVLAR®, NOMEX®, TWARON®, or X-FIPER®); or cloth comprised of resin impregnated or non-impregnated cellulose, glass or carbon fibers; and equivalents thereof. Moreover, the process for incorporating antenna 11 and metal interconnects 15 onto substrate 14 comprised modified surface micromachining methods for plastic substrates such as are known in the art (e.g., S. A. Stauth and B. A. Parviz, "Integration of silicon circuit components onto plastic substrates using fluidic self-assembly," in *Proceedings of the 2005 International Conference on MEMS, NANO and Smart Systems*, 2005, pp. 147-152) as shown in FIGS. 2A-2F.

Figure 2A:
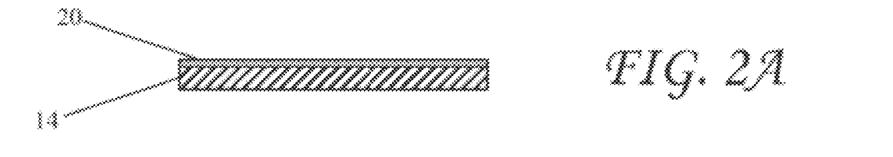
FIGS. 2A-2F show a modified surface micromachining method for providing an antenna and metal interconnects patterned on either PET or polyimide sheets.
Figure 2B:
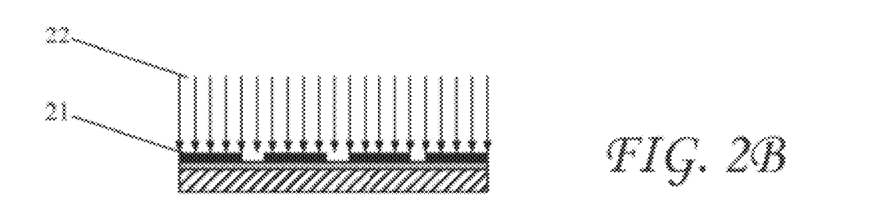
Figure 2C:
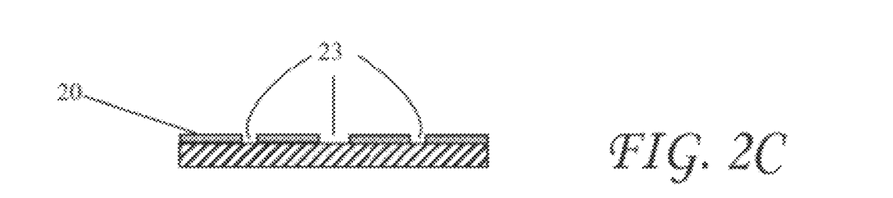
Figure 2D:
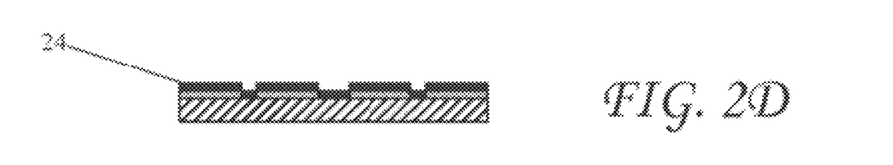
Figure 2E:
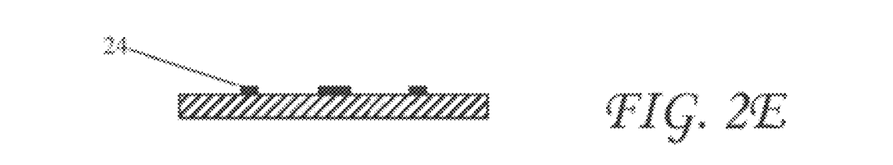
Figure 2F:
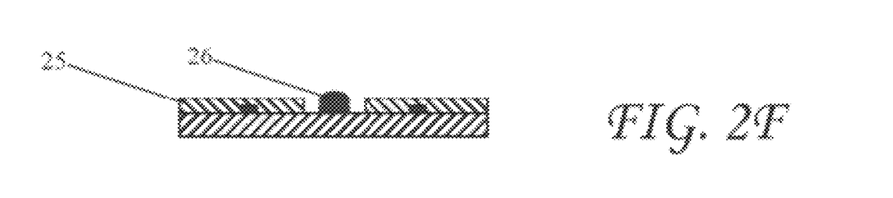

In particular, flexible substrate 14 is first coated with photoresist 20 and dried. The coated substrate is then patterned through mask 21 using a source of electromagnetic radiation 22. The exposed photoresist is then developed and removed leaving openings 23 as shown in FIG. 2C. A thin multilayer metal coating 24 is then deposited on the developed photoresist, the substrate exposed to a solvent to remove the remaining photoresist and the portion of the metal coating covering the photoresist to provide the metal pattern shown in FIG. 2E. The metal features are comprised of chrome, nickel, and gold layers with thicknesses of 5 nm, 150 nm, and 100 nm respectively for a final metal pattern thickness of about 255 nm. A 25 μm thick passivation layer 25 of SU-8 is then deposited over the metal pattern to define areas 23 for solder "bumping" for component attachment. Solder bumps (such as 26 shown in FIG. 2F) are created by dipping the micromachined substrate in a liquefied bath of a low melting point (m.p.) metal alloy and withdrawing the substrate through an alloy-water interface. Openings 23 in the SU-8 passivation layer is created above the portion of the metal pattern which defines the antenna such that the antenna is coated with a "thick" layer of the chosen alloy and in areas for metal bond pads 16 on metal interconnects 15 shown in FIG. 1A.

This is particularly important in the case of the integrated antenna. Because at frequencies of 315 MHz δ 255 nm thick metal layer would not create an antenna, the antenna portion of metal layer 24 is increased in thickness by the process of "solder bumping." After processing, the resulting thickness of metal over the antenna averages approximately 130 μm. Due to the short antenna length (2.81 cm), the sensor has a limited range at 315 MHz. Extra wire is soldered to the ends of the dipole antenna to form a resonant 315 MHz half-wave dipole.

The metal interconnects 15 are used as microstrip feed lines from the SAW filter 12 to the antenna 11 and photodiode 13. The metal interconnects constitute a set of coplanar slot lines which typically have impedances close to 50Ω. The antenna itself based on the small geometry and frequency of operation has input impedance close to 5Ω. The SAW filters used have an input impedance of 50Ω leading to a mismatch with the antenna. The losses associated with the antenna/SAW mismatch should be reduced due to short transmission length compared to wavelength at 315 MHz. Alternative antenna designs with input impedances closer to 50Ω can help improve the tag efficiency.

Figure 1C:
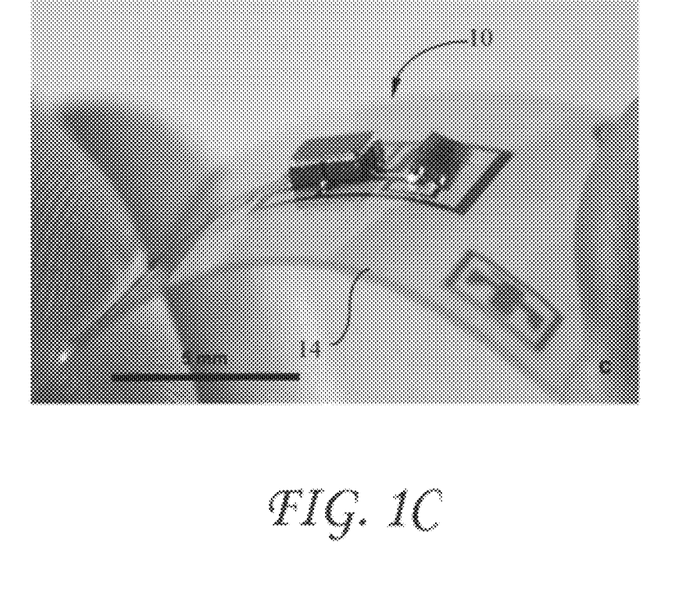
FIG. 1C demonstrates the flexibility of the first embodiment of the sensor tag.

The metal bond pads on the surface mount components are coated with the alloy by also dipping the part into the alloy and withdrawing through the alloy-water interface. Liquid flux is applied to the alloy-coated bond pads on both the substrate and the commercially available parts in order to remove surface oxides during alloy reflow. A hot air gun is used to melt the alloy once the commercially available parts are positioned on the substrate. Upon cooling, the parts are mechanically and electrically connected to the sensor tag. An example of a completed sensor tag is shown in FIG. 1C.

The choice of using PET, a polyimide or some other substrate material is dependent on the needs of the particular application. Polyimides and several other materials exhibit higher glass transition temperatures ($T_g$) and therefore allow for higher processing temperatures and the use of solder alloy having higher melting points. However, due to tint present in polyimide films, it might be desirable to use PET in certain applications where a clear transparent tag is necessary. Should this be the case, process/assembly temperatures would need to be carefully controlled due to the 70° C. $T_g$ of PET. Two suitable low melting point alloys include INDALLOY® 117 (a Bi—Pb—Sn—In—Cd fusible alloy having composition of comprises 44.7% bismuth, 22.6$^w/_o$ lead, 8.3$^w/_o$ tin, 19.1$^w/_o$ indium and 5.3$^w/_o$ cadmium, where $^w/_o$ means a percentage by weight of the particular constituent based on the total weight of the alloy) having a m.p. of 47° C. and INDALLOY® 158 (a Bi—Pb—Sn—Cd solder alloy having a composition of 50$^w/_o$ bismuth, 26.7% lead, 13.3$^w/_o$ tin, and 10$^w/_o$ cadmium) having a m.p. 70° C., although the utility of the latter material would be marginal due to the close correspondence of its melting point and the glass transition temperature of PET.

However, if the desire for a transparent tag is not paramount, that is when other substrate materials are used, the requirement for a very low melting point solder may not always be necessary and other intermediate melting-point tin-lead-bismuth alloy solders (e.g. 49.25$^w/_o$ Sn, 41.75$^w/_o$ Pb, 8$^w/_o$ Bi, 0.5$^w/_o$ Ag; m.p. ~170° C.) may be useful. It should also be noted that while alloys having melting points below about 100° C. are herein disclosed, many of the substrate materials mentioned above exhibit useful service temperatures of up to 200° C. and therefore allow for the use of higher melting point solders.

When building PET-based tags, a 47° C. alloy such as INDALLOY® 117 (Indium Corporation, Utica, N.Y.) was used. After assembly of the commercially available parts, the components are passivated by a layer of epoxy to help mechanically secure the parts to the substrate. This passivation is particularly important to allow for flexing of the sensor tag without damaging the connection between substrate bond pads and surface mount pads. A 25 μm layer of SU8 was deposited at temperatures below the melting temperature of the eutectic alloy. Flex testing of the final tag showed that low temperature processing of the SU8 caused it to be brittle and prone to cracking but suitable for mechanically stabilizing the surface mount components.

Figure 3A:
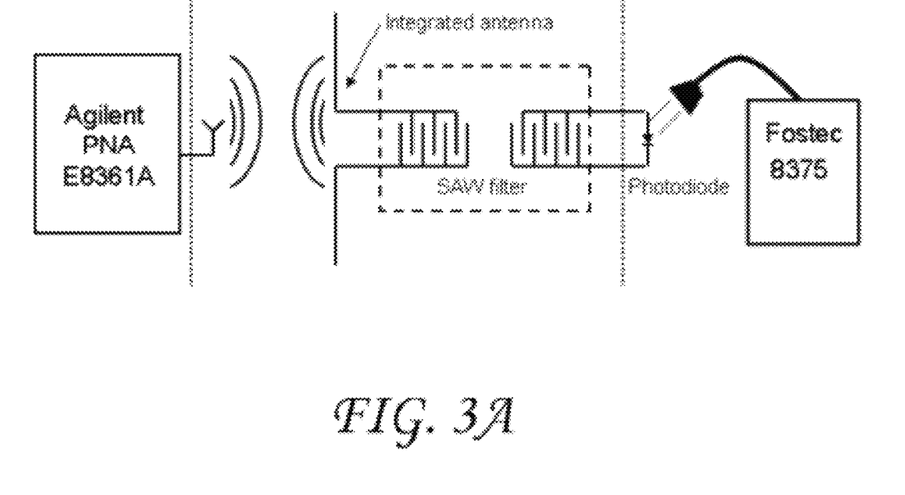
FIG. 3A illustrates a network analyzer used as the transceiver to both generate the interrogation signal and measure the reflected signal.
Figure 3B:
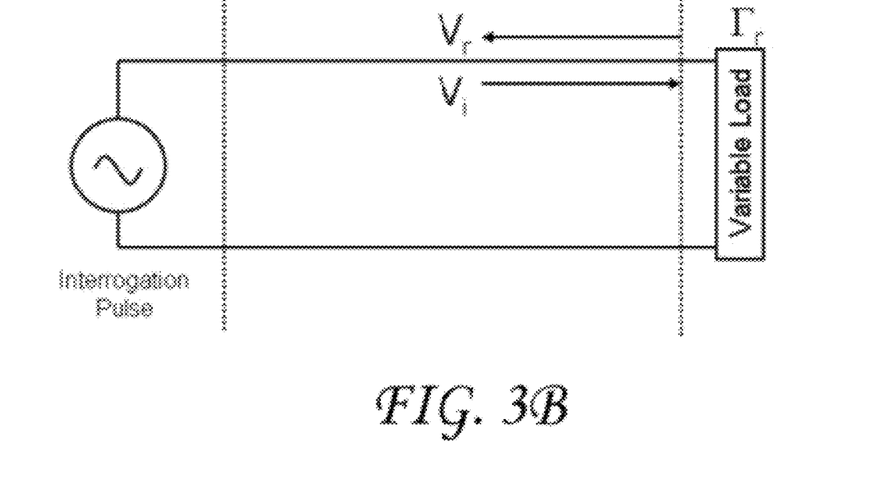
FIG. 3B illustrates how the calibrated system can be modeled as a transmission line with a variable reflection coefficient ($\Gamma_r$)) that corresponds to the sensor state.

A network analyzer (Model No. PNA-E8361A, Agilent Technologies, Inc., Santa Clara, Calif.) and a 315 MHz resonant dipole antenna is used to interrogate the sensor tag and receive the reflected signal. As illustrated in FIG. 3, the network analyzer looks at the reflected scattering parameter ($S_{11}$) in the narrow band defined by the SAW filter in order to determine the state of the sensor. By placing a SAW filter between the antenna and sensor load, it is possible to confine the response to a specific frequency. In applications where many sensors are used, different frequency bands can be allocated to individual sensors. A tungsten filament fiber-coupled lamp (Model No. 8375 available from Schott-Fostec, LLC, Auburn, N.Y.) is used to illuminate the photodiode with varying levels of light causing a change in electrical impedance. The fiber end is situated 2 mm from the surface of the photodiode.

Figure 4:
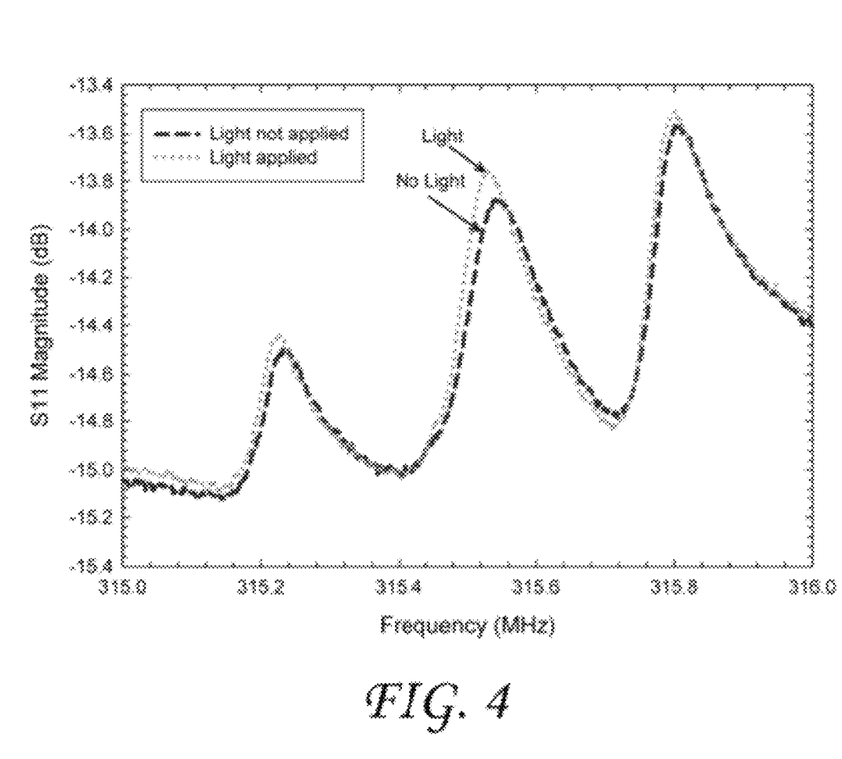
FIG. 4 shows the light levels that can be sensed at a distance of 3.6 m as indicated by changes in the magnitude response of $S_{11}$.

Single Tags: A test was conducted with a separation distance of 3.6 meters between the interrogation antenna and the sensor tag antenna. This tag used a 315.50 MHz SAW filter and an extended wire antenna for increased sensing range. The light source fixed at 2 mm from the photodiode was toggled between the off state and full output power (3,825,000 Lux measured at the diode). The response at the network analyzer in the form of $S_{11}$ magnitude indicates that at 315.50 MHz, the peak grows under lighted conditions and shrinks under dark conditions (see FIG. 4).

Figure 5:
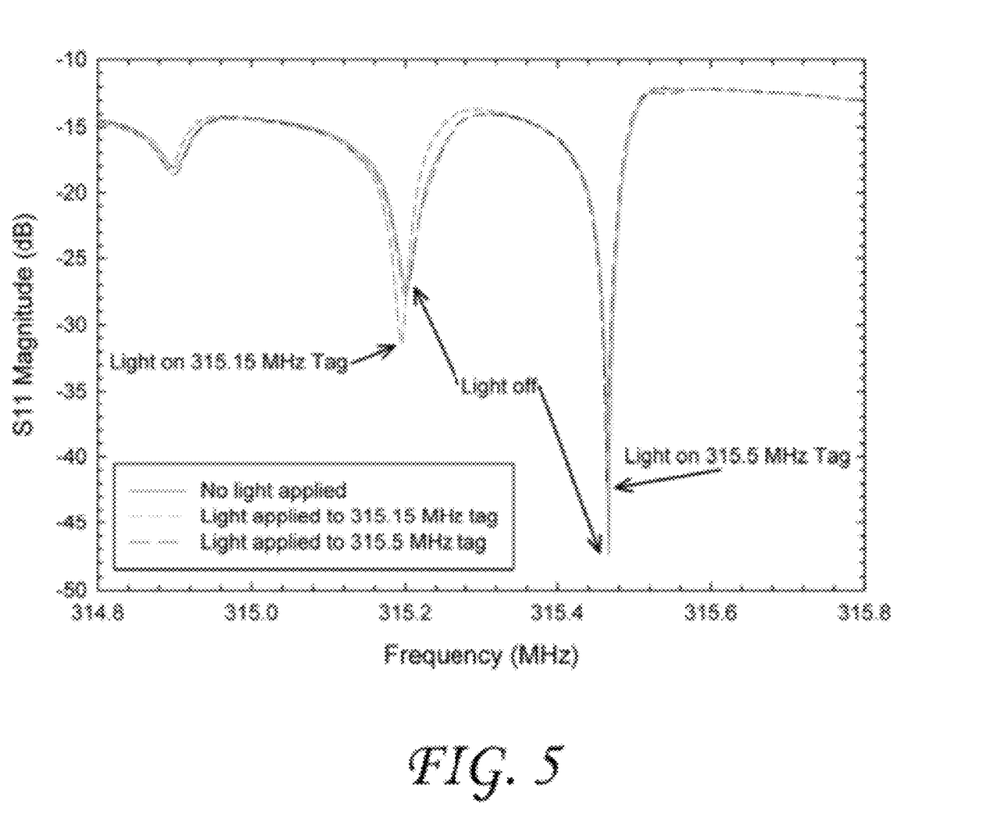
FIG. 5 shows the scattering parameters received at the network analyzer antenna from each of two tags located 20 cm away from a light source and each operating at a slightly different frequency.

Dual Tags: Sensor networks are more useful when many sensor nodes are operational; therefore, it was of interest to test the operation of multiple tags simultaneously. Two extended antenna tags were tested: Tag 1 was fitted with a 315.15 MHz SAW filter (P/N B3763, EPCOS Inc.); Tag 2 was fitted with a 315.50 MHz SAW filter (P/N B3765, EPCOS Inc). Both tags were placed within 20 cm of the interrogating antenna in order to obtain a stronger response signal from the sensor. Data received from each tag, where light was exclusively applied to Tag 1, Tag 2, or neither, is shown in FIG. 5. In the 'ON' state, the light was again at full power. Each case can be discriminated from the other by the magnitude shifts at each tag's respective operating frequency thereby revealing the respective sensor state of each.

Figure 6:
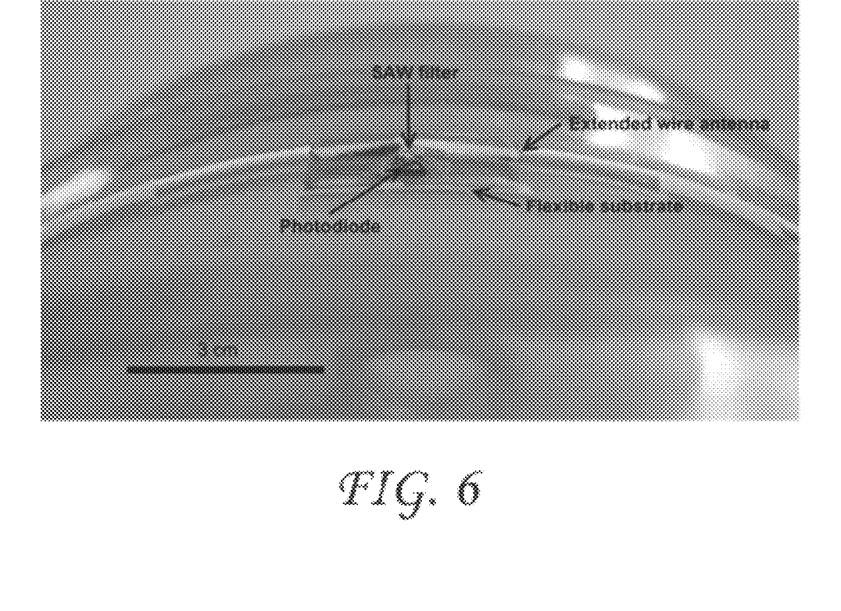
FIG. 6 shows a polyimide-based sensor tag applied to the curved surface of a cylinder, wherein extra wire length is added to the antenna to create a resonant half-wave dipole at 315.50 MHz.
Figure 7:
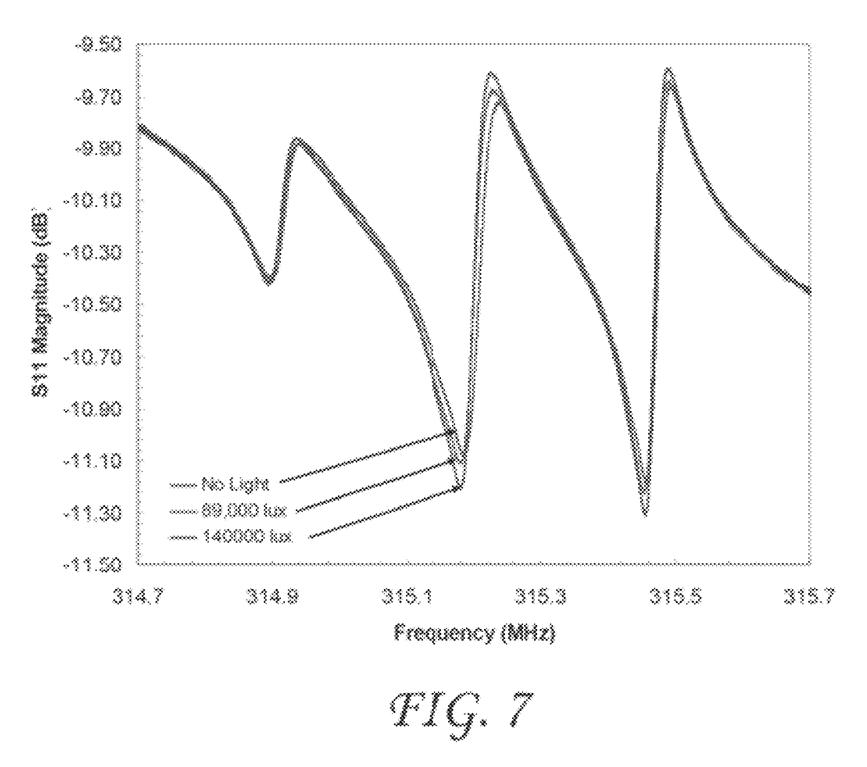
FIG. 7 illustrates that it is possible to use the sensor tag to discern between different levels of illumination, i.e., amplitudes at the response frequency indicate an amount of luminance.

Varying Light Levels: A sensor tag was placed on the surface of a 5 gallon water container to test for flexibility and functionality at different light levels. As shown in FIG. 6, the flexible tag was applied without damaging the connections between the surface mount components and substrate interconnect. The distance between the tag and the interrogating antenna was approximately 30.5 cm. The effect of wrapping the extended tag antenna around the cylinder can cause the effective distance to be closer than 30.5 cm. Based on photocurrent values listed in the photodiode datasheet and measurements taken with the tungsten light source, several values of luminance corresponding to power settings on the Fostec source were determined. The light source was then placed 2 mm over the diode and several known luminance values were applied. The response measured by the network analyzer shows that the magnitude of the reflections changes with varying light levels. Specifically, increased amplitudes at the operating frequency of the SAW filter correspond to increased levels of incident light as shown in FIG. 7.

A 2.45 GHz Embodiment:

Previous studies have shown that wireless sensors utilizing SAW devices require antenna sizes that are on the order of a wavelength in order to achieve efficient RF coupling. Operating a sensor with a 315 MHz SAW filter, for example, would necessitate a half-wave dipole antenna that is approximately 48 cm long. Operating in the MHz regime would increase overall system size due to larger antennas and limit the utility of the sensor in many consumer applications. We have previously demonstrated the integration of a SAW filter, antenna, and sensor on a flexible substrate in order to reduce overall system footprint. Further size reduction can be achieved by increasing the operating frequency of the SAW, which consequently reduces antenna size and SAW filter geometry.

Figure 8A:
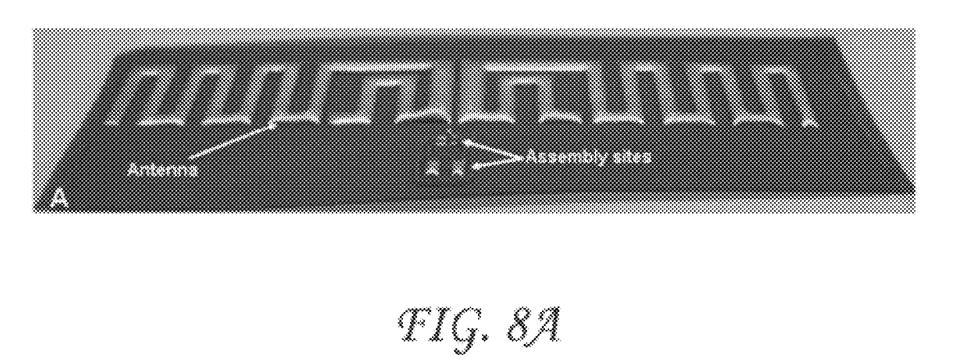
FIGS. 8A and 8B respectively show a 2.45 GHz SAW-based sensor tag utilizing a photodetector as the sensor element and a meandered 2.45 GHz dipole antenna can provide passive wireless measurements of light levels.
Figure 8B:
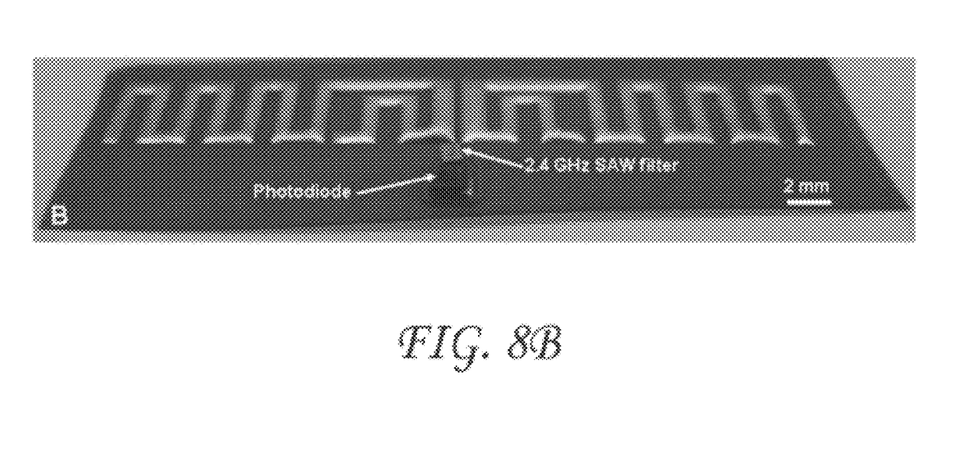
Figure 9:
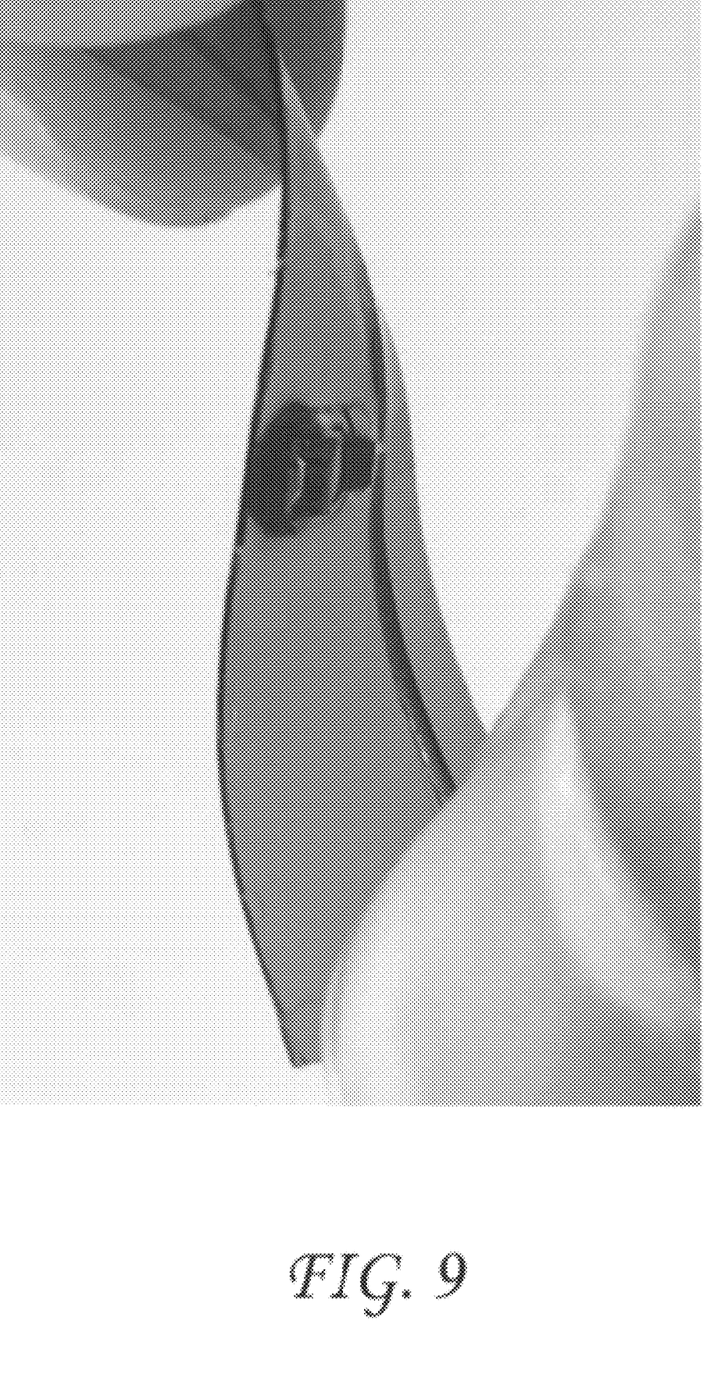
FIG. 9 illustrates a 2.45 GHz tag with a dipole antenna and light sensor disposed on a flexible substrate.

The fabrication steps required to prepare the polyimide substrate for circuit integration are again shown in FIGS. 2A-2F. The high glass transition temperature of polyimide allows for higher processing temperatures and compatibility with 70° C. solder alloy (INDALLOY®158, available from the Indium. Corporation, Utica, N.Y.). The 70° C. melting point of the alloy was chosen in order to allow the sensor tag to operate in high temperature environments while simultaneously providing a sufficiently low temperature to create a liquid bath of the alloy on a standard hotplate. After surface micromachining the substrate, a 2.45 GHz SAW filter (P/N B9413, EPCOS Inc., Palo Alto, Calif.) and a sensor element were manually aligned to the assembly sites FIGS. 8A and 8B, and the system was heated on a hotplate to 70° C. At 70° C. the alloy melts and wets both the bond pads on the chip and substrate. FIG. 9 demonstrates the flexibility of the sensor tag and the possibility of deploying the sensor on a variety of curved surfaces.

Figure 10:
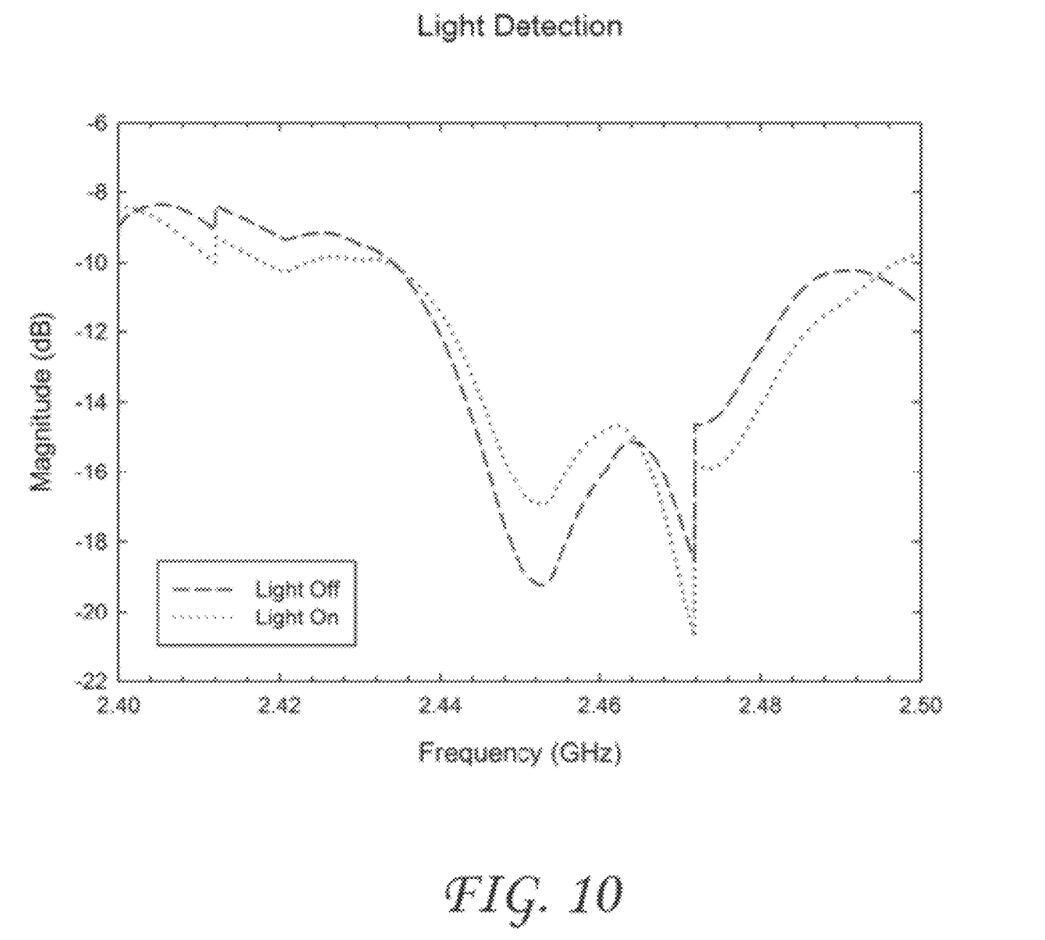
FIG. 10 shows a sensor tag equipped with a dipole antenna can distinguish between ambient conditions versus fully lit conditions. There is a 5 mm light-to-diode separation and a 6 cm patch-to-dipole antenna separation.
Figure 11:
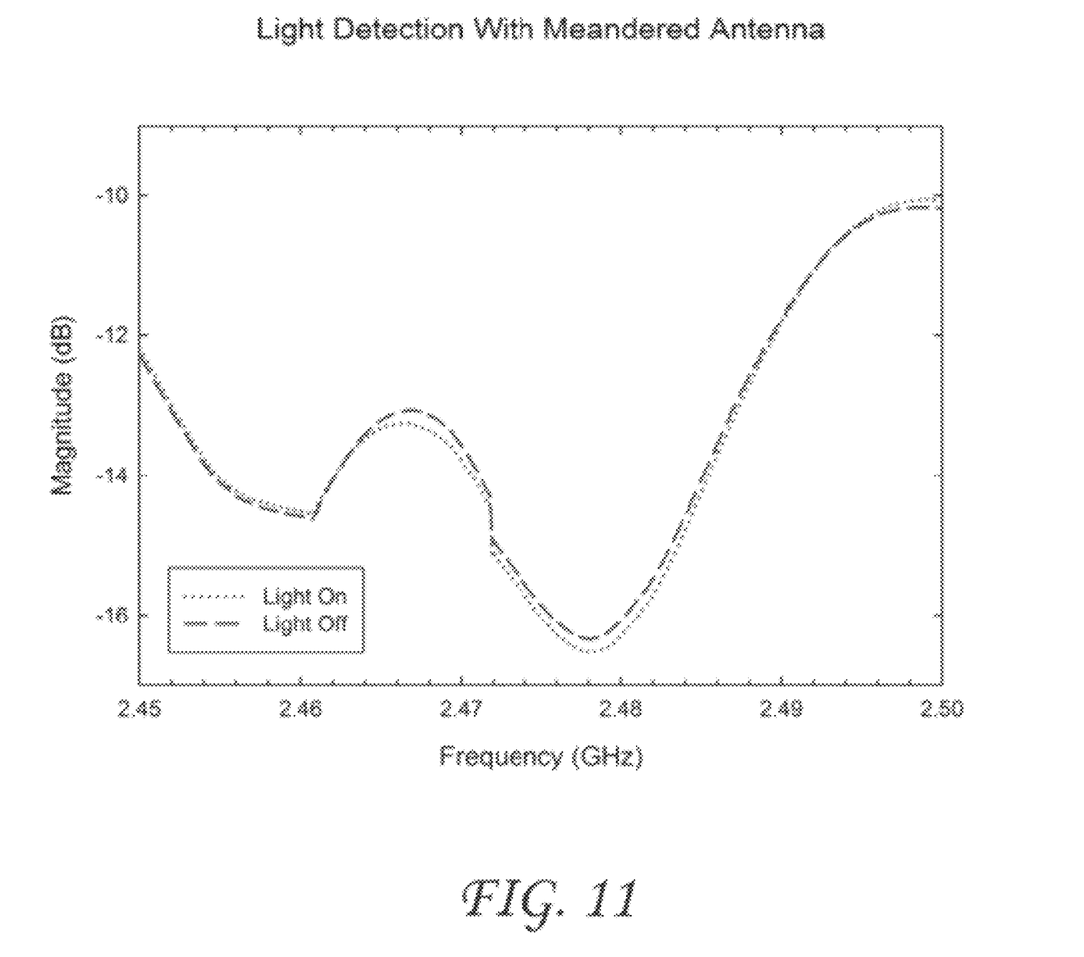
FIG. 11 illustrates a sensor tag with a meandered dipole antenna positioned 12 cm from the interrogating antenna, wherein the light source is 3 cm from photodetector.

Two types of sensors are used in this work, a photodetector (P/N TEMT6200FX01 available from Vishay Americas, Shelton, Conn.) to sense light, and a thermistor (P/N B57421V2103162, EPCOS Inc., Palo Alto, Calif.) to sense temperature, although, as noted above other impedance changing elements are also possible, including but not limited to pressure sensors, strain sensors, acoustic sensors, electromagnetic radiation sensors, electrochemical sensors and humidity and dew point sensors. An RF analyzer (FIELDFOX® Model No. N9912A, available from Agilent Technologies, Inc., Santa Clara, Calif.) and a 2.4 GHz patch antenna are used to interrogate the sensor tags and collect sensor information in the form of $S_{11}$ data. Two antenna designs are used on the integrated sensor tag, a standard half-wave dipole and a meandered dipole. FIG. 10 illustrates that a sensor tag equipped with a photodetector and a resonant half-wave dipole can clearly distinguish between ambient and fully lit conditions from a tungsten fiber-coupled lamp (Model No. 8375 available from Schott-Fostec, LLC, Auburn, N.Y.). Another test with the meandered antenna and light sensor demonstrates light sensing at further interrogator-sensor distances but at reduced signal levels as shown in FIG. 11.

Figure 12:
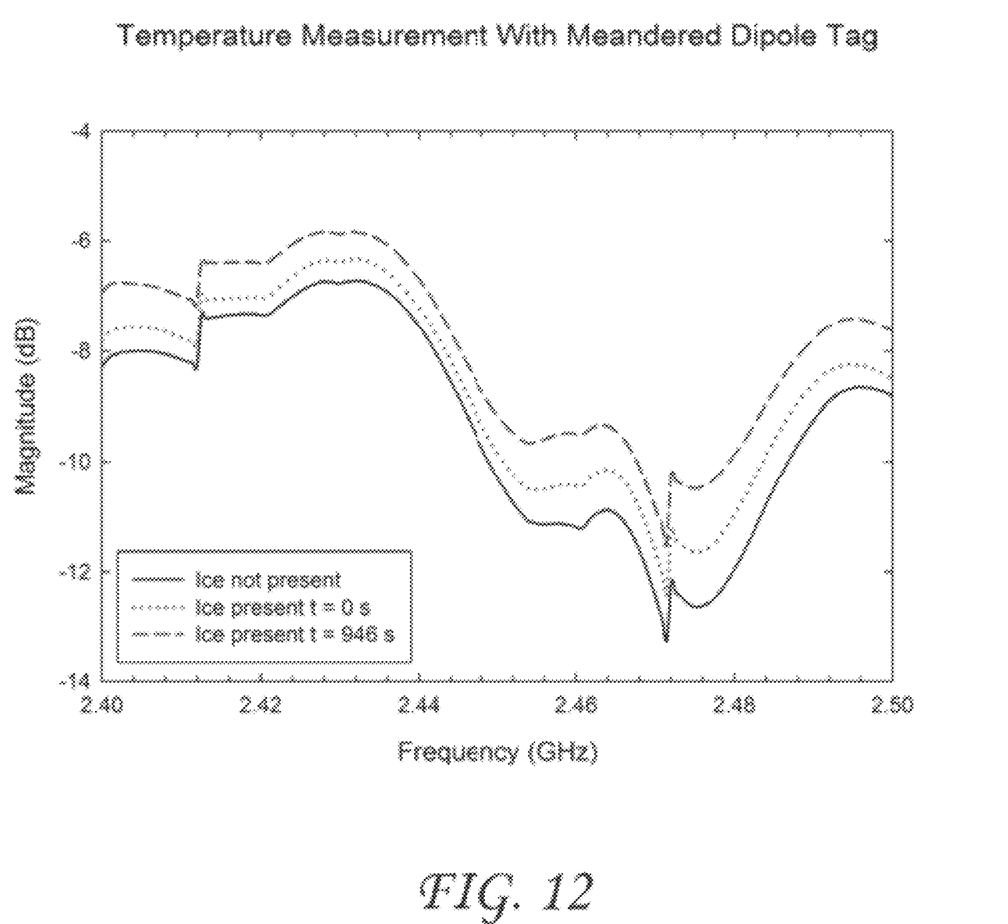
FIG. 12 shows temperature measurement using a thermistor and a dipole antenna on a flexible sensor tag.

A thermistor and half-wave dipole sensor design was tested using an ice pack placed on the thermistor sensing element. Placement of ice on the sensor caused an initial shift in $S_{11}$ magnitude, but as the temperature of the sensor changed, the $S_{11}$ magnitude shifted to reflect the change in impedance of the thermistor shown in FIG. 12. We have demonstrated operational sensor tags at 2.45 GHz allowing smaller antennas and even smaller footprints. In the full paper, we will provide additional experimental data and associated analysis comparing different sensor tag designs.

We have demonstrated that commercial surface mount electronics can be integrated onto the surface of microfabricated plastic substrates for wireless passive sensing. A sensor tag with a SAW filter and a photodiode was able to report the presence or absence of light from 3.6 meters away. In principle any device that changes impedance with state can act as a sensor on this platform. Simultaneous discernment between two sensor tags is also demonstrated through frequency selectivity of different SAW filters. Due to the narrow passbands of SAW filters, it may be possible to construct larger networks utilizing differences in SAW operating frequencies to create unique identifiers. Additionally, a sensor tag was affixed to a curved surface and able to discern between two different levels of illumination as well as darkness.

Having thus described exemplary embodiments of the present invention, it should be noted by those skilled in the art that the disclosures herein are exemplary only, and that various other alternatives, adaptations, and modifications may be made within the scope of the present invention. Accordingly, the present invention is not intended to be limited to the specific embodiments illustrated herein.

Finally, to the extent necessary to understand or complete the disclosure of the present invention, all publications, patents, and patent applications mentioned herein are expressly incorporated by reference therein to the same extent as though each were individually so incorporated.

What is claimed is:

1. A passive wireless sensor, comprising:
    a surface acoustic wave (SAW) filter;
    an impedance changing element; and
    an antenna matched to a microwave frequency;
    wherein the SAW filter, impedance changing element and antenna are electrically interconnected and fixedly integrated onto a surface of a flexible substrate, wherein the SAW filter, impedance changing element and antenna are interconnected using a low melting point solder.

2. A sensor network comprising two or more of the passive wireless sensors of claim 1.

3. The wireless sensor of claim 1, wherein the antenna is matched to a microwave frequency between about 315 MHz and about 2.45 GHz.

4. The wireless sensor of claim 3, wherein the microwave frequency is about 315 MHz or about 2.45 GHz.

5. The wireless sensor of claim 3, wherein the microwave frequency is 2.45 GHz.

6. The wireless sensor of claim 1, wherein the impedance changing element is a sensor to respond to an environmental parameter.

7. The wireless sensor of claim 6, wherein the environmental parameter is selected from the group of parameters consisting of EMF radiation frequencies, mechanical pressure, temperature, mechanical strain, sound, electrochemical, and atmospheric moisture and pressure.

8. The wireless sensor of claim 1, wherein the flexible substrate is selected from the group consisting of a polymer, cloth comprising polymer fibers, and cloth comprising carbon, glass or cellulose fibers.

9. The wireless sensor of claim 8, wherein the polymer selected from the group consisting of polyethylenes, polypropylenes, polycarbonates, polyesters, polyamides and polyimides.

10. The wireless sensor of claim 9, wherein the polymer comprises polyethylene terephthalate, poly(4,4'-oxydiphenylene-pyromellitimide), or p-phenylene terephtalamides.

11. The wireless sensor of claim 9, wherein the polymer comprises polyethylene terephthalate.

\* \* \* \* \*